United States Patent [19]

Katoo et al.

[11] Patent Number: 4,556,940
[45] Date of Patent: Dec. 3, 1985

[54] ROBOT VEHICLE

[75] Inventors: Hisashi Katoo; Kunio Fujiwara; Yoshikazu Kawashima, all of Amagasaki, Japan

[73] Assignee: Mitsubishi Denki Kabushiki Kaisha, Tokyo, Japan

[21] Appl. No.: 299,230

[22] Filed: Sep. 3, 1981

[30] Foreign Application Priority Data

Sep. 5, 1980 [JP] Japan .................................. 55-124462

[51] Int. Cl.$^4$ ............................................ G06F 15/50
[52] U.S. Cl. .................................... 364/424; 364/444;
364/453; 364/571; 318/587; 180/168
[58] Field of Search ............... 364/443, 444, 449, 460,
364/559, 424, 453, 571; 340/23, 24, 988; 73/178
R; 318/587; 180/167–169

[56] References Cited

U.S. PATENT DOCUMENTS

| | | | |
|---|---|---|---|
| 3,845,289 | 10/1974 | French | 364/444 |
| 3,849,636 | 11/1974 | Helms | 364/460 |
| 3,925,641 | 12/1975 | Kashio | 340/23 |
| 4,084,241 | 4/1978 | Tsumura | 364/460 |
| 4,139,889 | 2/1979 | Ingels | 364/460 |
| 4,309,758 | 1/1982 | Halsall et al. | 364/449 |

FOREIGN PATENT DOCUMENTS 2901318 8/1979 Fed. Rep. of Germany .
3003287 8/1980 Fed. Rep. of Germany .

OTHER PUBLICATIONS

Guided Carts Link Machines into "System", by R. L. Hatschek, *American Machinist*, Aug. 1980, pp. 97–100.

*Primary Examiner*—Gary Chin
*Attorney, Agent, or Firm*—Oblon, Fisher, Spivak, McClelland & Maier

[57] ABSTRACT

A robot vehicle for automatic operation in a predetermined travelling route comprises a pair of driving wheels connected to a driving device; means for detecting revolving speeds of said driving wheels; means for detecting azimuth of the travelling direction of said robot vehicle; a memory device for memorizing a travelling program including data of a travelling distance and an azimuth; and a control processor device which control the travelling of said robot vehicle depending upon the travelling program of said memory device under comparing the travelling distance and azimuth of the travelling program with a travelling distance detected by said revolving speed detecting means and an azimuth detected by said azimuth detecting means.

1 Claim, 13 Drawing Figures

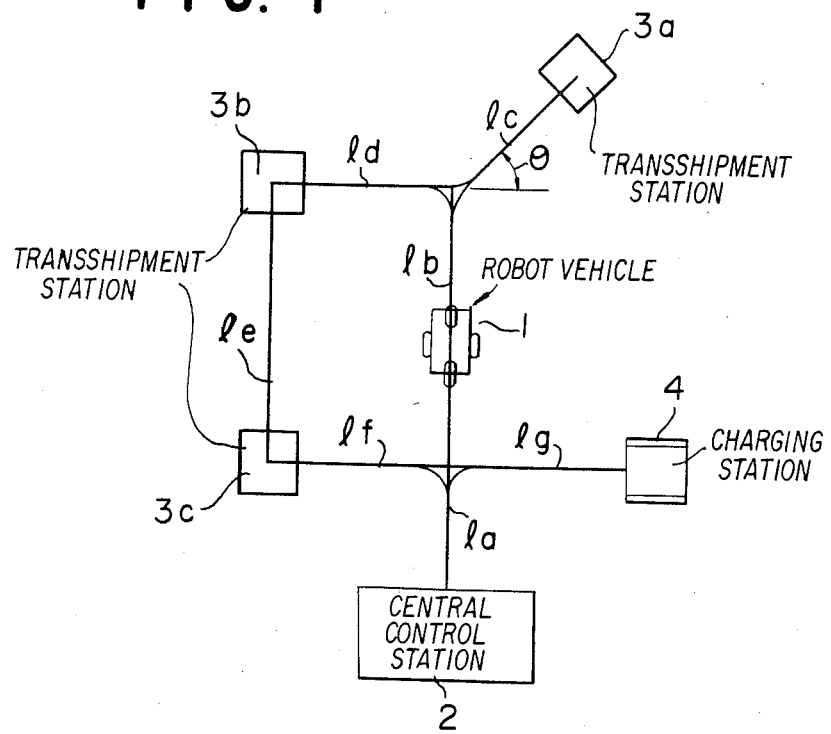
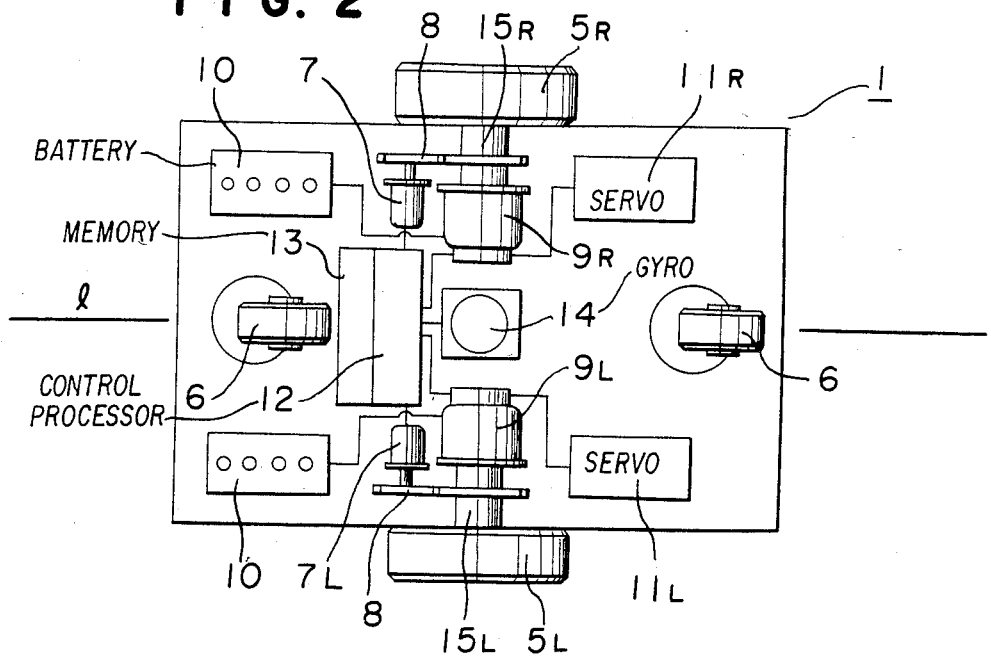

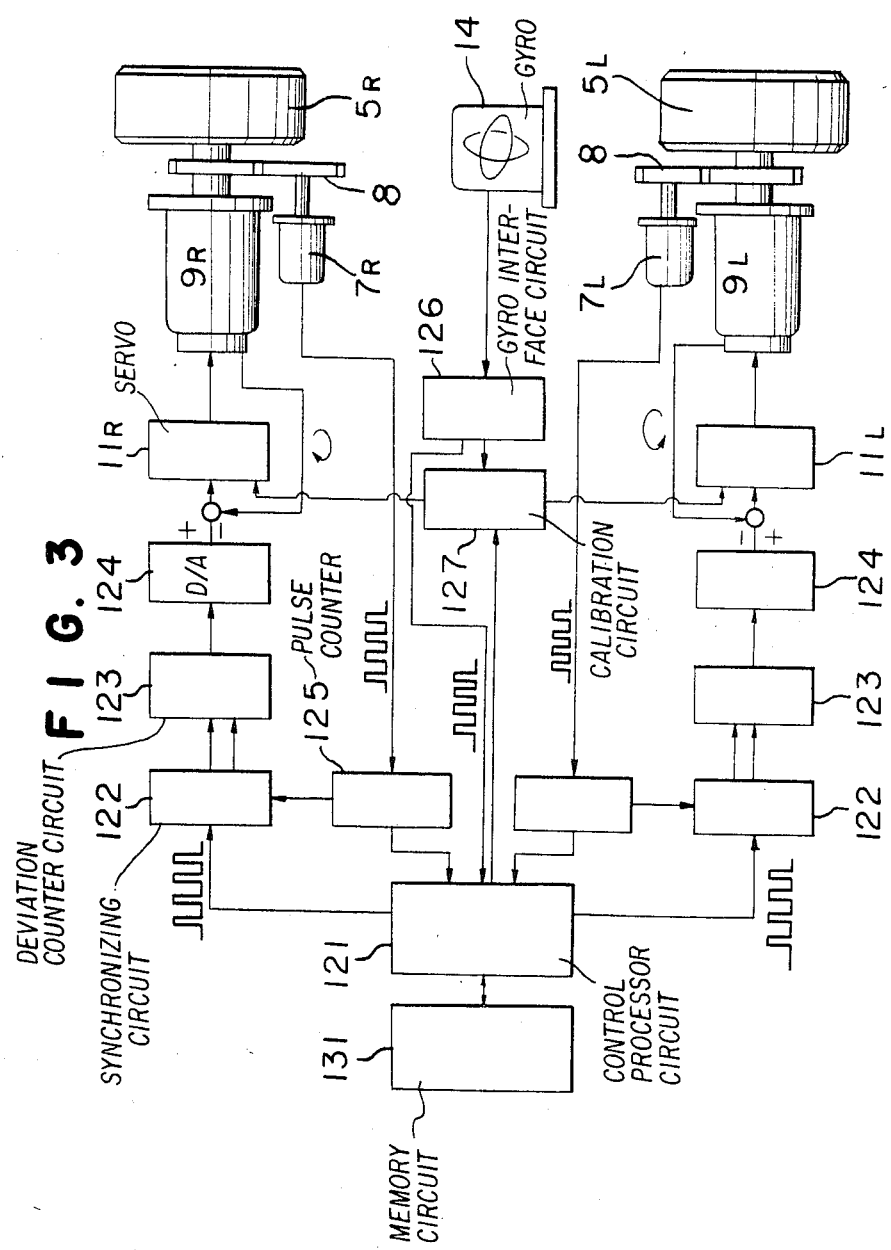

F I G. 8
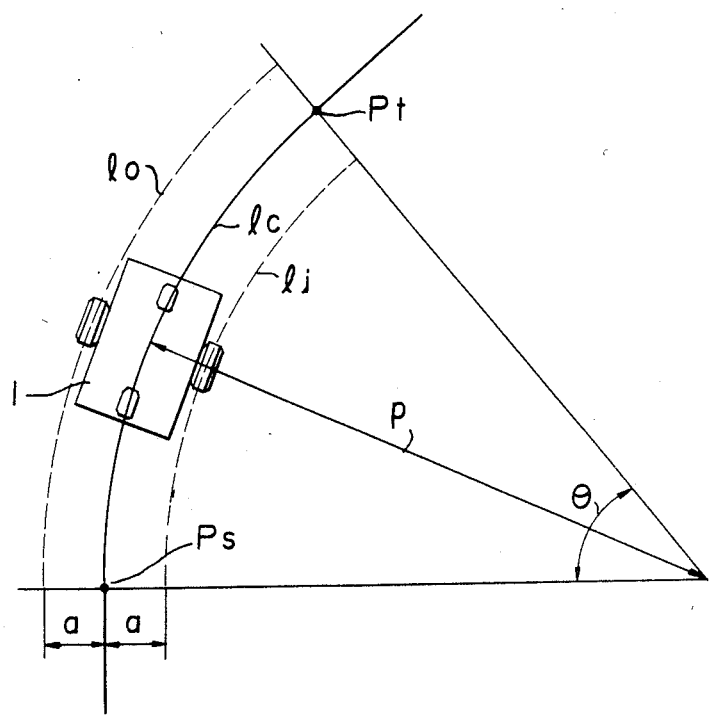
F I G. 9
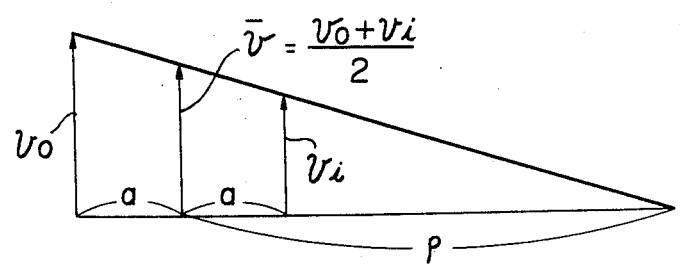

ROBOT VEHICLE

BACKGROUND OF THE INVENTION

1. Field of the Invention

The present invention relates to a robot vehicle which automatically travel along a predetermined travelling route. More particularly, it relates to a robot vehicle such as carts in a factory or a golf cart and the other carts for labour saving devices in agricultural working and land working etc.

2. Description of the Prior Art

Heretofore, certain robot vehicles have been proposed. A robot vehicle receives radio wave having a specific frequency generated from an inductive wire to cause the robot vehicle to travel along the route or a robot vehicle uses a photoelectric sensor to travel the robot vehicle along the route formed by an optical reflective tape instead of the inductive wire.

The robot vehicle is equipped with a detector for detecting a deviation from the inductive wire or the optical reflective tape laid on the surface for travelling and the robot vehicle is controlled to calibrate the deviation. The use of a leading element for the route has been the indispensable element. Therefore, it has been necessary to re-install the leading element when a lay-out of an instrument and equipment in a factory or a warehouse is modified or an order for stages is modified. When an inductive wire is used, the embedding work for the installation has not been easy. When an optical reflective tape is installed, it is not durable to dust and stain.

Transportation means for factory instruments and equipment have been studied not only using a conveyor line suitable for a mass production but also workpiece transportation means between stages suitable for small productions of various kinds of products. It is important to easily attain a modification of lay-outs in various stages. The conveyer line is a disadvantageous transportation means in the case of various transportations for small productions of various kinds of products and modifications of lay-outs of stages in model changes for various needs of products.

It is necessary to find a suitable transportation system.

A job-shop production system in a factory shown in FIG. 1 comprises stations for trans-shipment are placed adjacent to job-shops for various stages, and a charging station for charging a battery as a power source of robot vehicle and a central control station having a terminal function for robot vehicles for monitoring the total system near a warehouse. The robot vehicles are used as workpiece transportation means between the stations.

FIG. 1 is a schematic view of the robot vehicle system wherein the reference (1) designates the robot vehicle; (2) designates the central control station; (3a), (3b), (3c) respectively designate stations for trans-shipment; (4) designates a charging station; and 1a-1g respectively designate the traveling route.

In the conventional robot vehicle, the inductive wire or the optical reflective tape is installed on the parts corresponding to the travelling route (1a-1g).

SUMMARY OF THE INVENTION

It is an object of the present invention to provide an improved robot vehicle.

It is another object of the present invention to provide an improved robot vehicle which is durable to dust and stain and can be easily used in modification of a lay-out of instruments and equipments in a factory or a warehouse or a modification of order of steps.

The foregoing and other objects of the present invention have been attained by providing a robot vehicle for automatic operation in a predetermined travelling route which comprises a pair of driving wheels connected to a driving device; means for detecting revolving speeds of said driving wheels; means for detecting azimuth of the travelling direction of said robot vehicle; a memory device for memorizing a travelling program including data of a travelling distance and an azimuth; and a control processor device which control the travelling of said robot vehicle depending upon the travelling program of said memory device under comparing the travelling distance and azimuth of the travelling program with a travelling distance detected by said revolving speed detecting means and an azimuth detected by said azimuth detecting means.

BRIEF DESCRIPTION OF THE DRAWINGS

FIG. 1 is a schematic view of the robot vehicle system;

FIG. 2 is a schematic view of one embodiment of important parts of the robot vehicle of the present invention;

FIG. 3 is a block diagram of one embodiment of a control system of the present invention;

FIG. 8 is a view for a control in a turn travelling;

FIG. 9 is a view showing speed allotment in the turn travelling control;

DETAILED DESCRIPTION OF THE PREFERRED EMBODIMENTS

Figure 4:
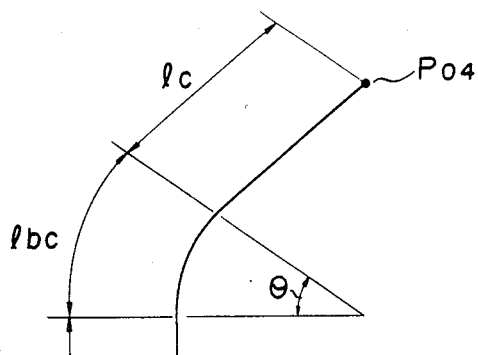
FIG. 4 is a partial view of a travelling route.

FIG. 2 is a schematic plane view of one embodiment of a robot vehicle equipped with various devices according to the present invention.

The references (5R) and (5L) respectively designate a pair of driving wheels; (6) designates auxiliary front and rear wheels; (7R) and (7L) respectively rotary encoders interlocking through a gear train (8) to the driving wheels (5R), (5L) and the rotary encoders are means for detecting revolving speeds of the wheels. The references (9R), (9L) designate servo-motors for driving the driving wheels (5R), (5L) as the driving devices. The power source for the servo-motors (9R), (9L) is a battery (10). The references (11R) and (11L) respectively designate servo devices for controlling the servo-motors (9R), (9L), and the reference (12) designates a control processor for controlling the travel of the robot vehicle; (13) designates a memory device for memorizing a travelling program including data of a travelling distance and a azimuth of the robot vehicle. A microcomputer can be used for a combination of the control processor (12) and the memory device (13). The reference (14) designates a gyro device having azimuth detecting function which is means for detecting azimuth. The control processor (12) is connected to the rotary encoders (7R), (7L) for inputting the signals of revolving speeds of the driving wheels (5R), (5L) and also is connected to the servo devices (11R), (11L) for controlling the turning of the driving wheels (5R), (5L). The driving wheels (5R), (5L) are respectively connected to the corresponding shafts (15R), (15L). The axial lines of the shafts are set to correspond to the center line of the robot vehicle (1) and has the structure for the travel control in perpendicular to the reference travelling route shown by a letter l in FIG. 2. The gyro device (14) is placed near the center of the robot vehicles (1) so as to precisely detect the azimuth.

FIG. 3 is a block diagram showing the detailed system for controlling the driving wheels as the embodiment of the present invention. The control processor (12) comprises a central processor circuit (121); a synchronizing circuit (122); a deviation counter circuit (123); a D/A conversion circuit (124); a pulse counter (125); a gyro-interface circuit (126) and a calibration circuit (127). The memory circuit memorizes a travelling program for defining routes for travelling; a straight travelling, a turning position and a stopping position of the robot vehicle and distances between stations. The memory device (13) comprises the memory circuit (131).

The detailed operation will be illustrated below.

The principle of the operation of the robot vehicle having the structure will be illustrated.

Referring to FIG. 1, the travelling route of the robot vehicle (1) from the start at the central control station (2) through the travelling route (la), (lb), (lc) to the station for trans-shipment (3a) will be considered.

The total distance L of travel for the robot vehicle (1) is given by the equation:

$$L = la + lb + lbc + lc$$

under the consideration of the distance lbc needed for the turning of the robot vehicle (1) shown in FIG. 4 wherein the reference $\theta$ designates an angle for turning the robot vehicle (1). The total travelling distance L is previously measured to memorize data of distance corresponding to the travelling distance L in the memory device (13). A program for the straight travelling for the distance la+lb followed by the predetermined turning decided by the distance lbc and the turning angle $\theta$ and further followed by the straight travelling for the distance lc is memorized in the same memory device (13). The angle for turning $\theta$ is output by the gyro device (14) equipped in the robot vehicle (1). Thus, the robot vehicle can be automatically controlled in the practical travelling by combination of serial control signals (pulse train) as composite of the distance data and the travelling program and the azimuth signal given by the gyro device (14). The practical travel distance can be determined by the output signal of the rotary encoder for detecting the revolving speeds of the driving wheels (5R), (5L). Therefore, the object position can be determined and the robot vehicle (1) can be lead from the central control station (2) to the station for trans-shipment (3a).

In the aforementioned operation, the revolving speeds of the driving wheels (5R), (5L) are different because of the turning. Thus, it is preferable to compare an arithmetic average of both revolving speeds with the data for travelling distance.

In accordance with the aforementioned system, it is easily attained to travel the robot vehicle from the central control station (2) through the stations for trans-shipment (3a)→(3b)→(3c) to the central control station (2) as a recycling route.

The control operation in the straight traveling and the turning travelling of the robot vehicle (1) will be illustrated in detail.

When the robot vehicle (1) is travelled to the predetermined straight part of the travelling route, the revolving speeds of both driving wheels (5R), (5L) are the same. In the practical travelling, it is not easy to travel in complete straight travelling because of unevenness of the surface and difference of characteristics of the servo devices (11R), (11L). Thus, a curved travelling or deviation may be caused. The deviation angle to the predetermined straight direction is detected by the gyro device (14) and the following desired calibration control corresponding to the deviation angle is performed to overcome the problem.

Figure 5:
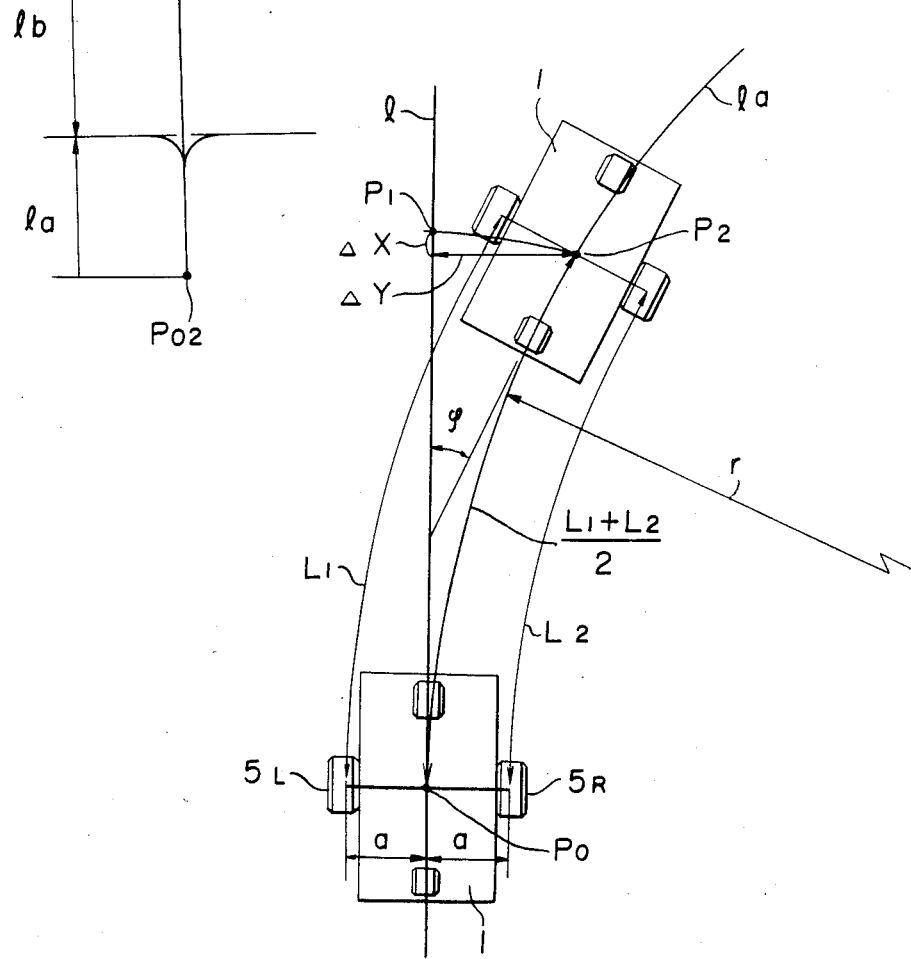
FIG. 5 is a view for a deviation in the straight travelling.

In FIG. 5 as the schematic view of the curved travelling and the deviation during the straight travelling of the robot vehicle, when the practical travelling route (la) of the robot vehicle (1) is shifted from the reference travelling route (straight) (l), the gyro device (14) equipped in the robot vehicle (1) detects the deviation angle $\phi$ at the point P$_2$.

The deviations $\Delta Y$ and $\Delta X$ in the traverse direction and in the travelling direction to the reference travelling route l of the robot vehicles are approximated by the equations:

$$\Delta Y = \frac{L_1 + L_2}{2} \sin\phi$$

$$\Delta X = \frac{L_1 + L_2}{2} (1 - \cos\phi)$$

if the angle $\phi$ is small, wherein the references L$_1$ and L$_2$ respectively designate the travelling distances of the left wheel (5L) and the right wheel (5R) and accordingly, (L$_1$+L$_2$/2 designates a distance for the practical travelling of the robot vehicle (1). Thus, the point (P$_2$) for initiating the calibration control is noted by $\Delta Y$. On the other hand, the robot vehicle (1) should travel from the point P$_0$ to P$_1$ for a distance (L$_1$+L$_2$/2 on the reference travelling route l. Thus, it causes the deviation for $\Delta X$ in the travelling direction. The deviations $\Delta X$ are sequentially added to the total predetermined distance to reach the precise object point.

If the angle $\phi$ is quite small, the deviation $\Delta Y$ is also quite small and the deviation $\Delta X$ is smaller than $\Delta Y$. Thus, the calibration for $\Delta X$ is not needed except a long travelling route.

Figures 6A, 6B:
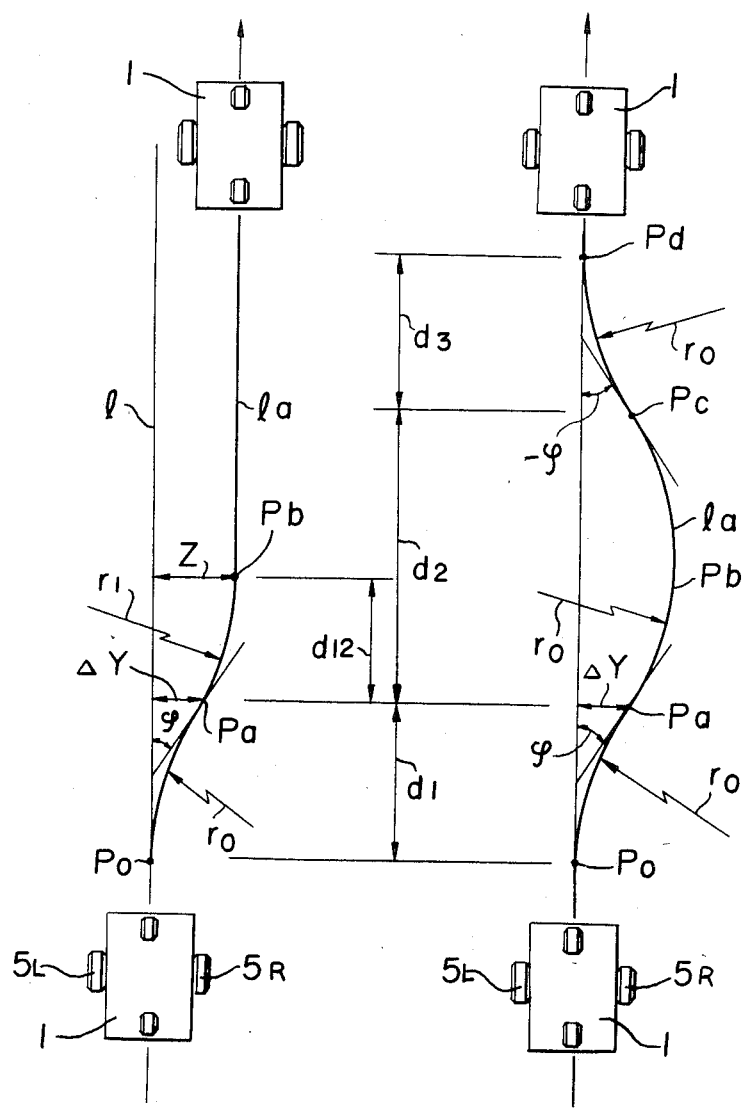
FIGS. 6a and 6b are respectively views for each control in the straight travelling.

FIGS. 6a and 6b are schematic views for calibrations to the deviation in the straight travelling of the robot vehicle.

In FIG. 6a, when the deviation causes from the point P$_0$ on the reference travelling route l to reach the deviation $\Delta Y$ in the transversal direction for the initiation of the calibration control at the point Pa, (the deviation angle of the output of the gyro device at Pa position is $\phi$), the calibration control is performed to give zero for the deviation angle of the output of the gyro device (14) at the point Pb by increasing the revolving speed of the right driving wheel (5R) of the robot vehicle (1).

In FIG. 6, the radius of curvature $r_0$ between $P_0-P_a$ and $r_1$ between $P_a-P_b$ is given by the equation:

$$r_0 = \frac{L_1 + L_2}{2} \cdot \frac{1}{\phi} \quad (1)$$

The radius of curvature $r_1$ is given depending upon the calibration voltage applied to the servo device (11R) for increasing the revolving speed of the right wheel (5R). In the case of $r_0 \approx r_1$, the point Pb for completion of the calibration control is deviated to the standard travelling route 1 for a deviation Z:

$$Z = 2\Delta Y$$

The radius of curvature $r_0$ is operable at the point Pa by the equation (1). Thus, a radius of curvature $r_1$ for the desired calibration can be selected depending upon the radius of curvature $r_0$.

In the calibration control, the deviation Z in the transversal direction to the standard travelling route 1 is remained. The deviation Z is quite small. Thus, the calibration control can be practically applied except a long straight travelling distance.

FIG. 6b shows the calibration control for eliminating the deviation Z in the transversal direction. This is effective when the straight travelling route is long.

The calibration control to the point Pb in FIG. 6b is substantially the same as the calibration control shown in FIG. 6a, however, the radius of curvature $r_1$ for calibration between Pa—Pb is given to be equal to $r_0$ and the calibration voltage is continuously applied after the point Pb to reach the point Pc for reversing the deviation angle signal of the gyro device (14) to that of the point Pa. At the point Pc, the calibration voltage is applied through the servo device (11L) to the opposite driving wheel (5L) (the opposite to the wheel (5R) driving in Pa—Pc). At the point Pd for zero of the deviation angle as the output of the gyro device (14), the calibration control is completed.

At the point Pd, the difference between the revolving speeds of the driving wheels (5R), (5L) becomes zero. In order to give the condition of the radius of curvature $r_1 = r_0$, ($r_0$ is given by the equation (1)), the calibration voltage is controlled to give the revolving speed ratio:

$$VR/VL = \frac{r_0 + a}{r_0 - a} = \frac{\frac{L_1 + L_2}{2}\phi + a}{\frac{L_1 + L_2}{2}\phi - a} \quad (2)$$

wherein the references VR and VL respectively designate the revolving speeds of the right and left wheels; and the reference a designates ½ of a tread distance between the driving wheels (5R), (5L). (See FIG. 9)

In accordance with the calibration control, the robot vehicle (1) can be returned in the reference travelling route 1 after the calibration whereby the stable straight travelling is attained for a long distance.

Figure 7A:
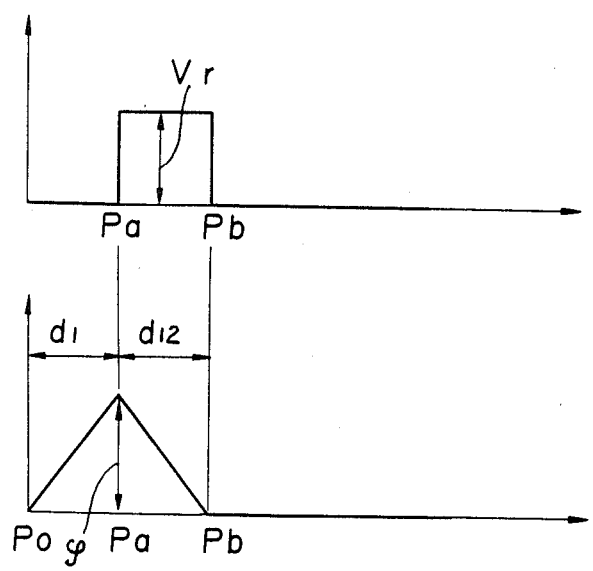
FIGS. 7a and 7b are respectively view for each control corresponding to the features shown in FIGS. 6a and 6b.
Figure 7B:
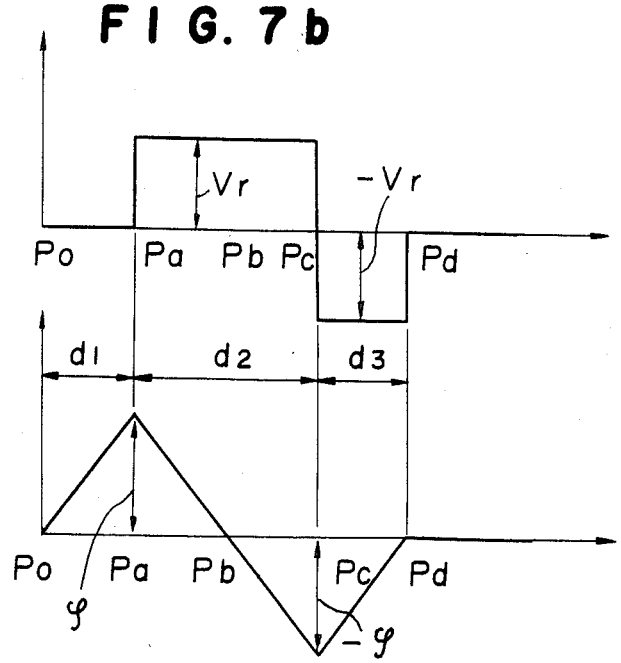

FIGS. 7a and 7b respectively show the conditions applying the calibration voltage VR in the calibration control and the conditions outputting the deviation angle $\phi$ of the gyro (14) corresponding to FIGS. 6a and 6b. In FIG. 7, the references $d_1$, $d_2$ . . . respectively show sections shown in FIGS. 6a and 6b.

The control operation for turning of the robot vehicle will be illustrated. FIG. 8 shows the principle. In FIG. 8, the references Ps and Pt respectively designate a turn intiation point and a turn completion point; $l_0$ and $l_i$ respectively designate an outer wheel route and an inner wheel route of the driving wheels of the robot vehicle (1) and lc designates a reference travelling route of the turning part; $\theta$ designates a turn angle; and $\rho$ designates a radius of curvature.

The difference of the azimuth signals of the gyro device (14) of the robot vehicle (1) is changed for the angle $\theta$ from the point Pa to the point Pt. Thus, the turn completion point can be easily detected. However, the turning operation can not defined only by the difference, and relates to the radius of curvature $\rho$ for the turning travelling.

FIG. 9 shows a principle for the radius of curvature. In FIG. 9, the references $V_0$ and $V_i$ respectively designate speeds of the outer wheel and the inner wheel; and V designates an average speed as $V = (V_0 + V_i)/2$. During the turning operation, the robot vehicle (1) travels at the average speed V. As shown in FIG. 9, $V_0 = (1 + (a/\rho))V$ and $V_i = (1 - (a/\rho))V$ are given. Thus, the ration of the speed $V_0/V_i$ is given by the equation:

$$V_0/V_i = \frac{\rho + a}{\rho - a} \quad (3)$$

The radius of curvature $\rho$ is decided by the ratio of the speed of the outer wheel to the speed of the inner wheel in the turning operation (the ratio of turning speeds). The desired turning operation is attained by controlling the azmimuth signal of the gyro device (14) and the ratio of the turning speeds of the driving wheels (5R), (5L).

Moreover, the following equation is given in the case of $\rho = 0$ in equation (3):

$$V_0/V_i = -1 \quad (4)$$

This equation shows that the robot vehicle (1) can change the direction without changing the position by providing the opposite directional revolution of the right and left driving wheels at the same speed (set point turning). The angle for the set point turning can be detected by the gyro device (14). The 90 degree turn and the switch back travelling to approach the station (these are commonly operated) are easily attained in narrow regions. Therefore, it provides remarkably effective travelling operation.

The operation for reaching to the object point by detecting the travel distance and the control operation in the straight and turning travelling of the robot vehicle have been illustrated. The operation is attained by using the circuits shown in the block diagram of FIG. 3.

The central processor circuit outputs control pulse trains for driving the right and left driving wheels (5R), (5L) by receiving an external starting signal. The control pulse trains respectively transmitted to the right driving wheel system and the left driving wheel system.

The central processor circuit outputs the control pulse trains depending upon the memorized travelling programs such as programs for a designation of the travelling route, modes for acceleration and deceleration in the travelling and the normal travelling and modes for straight travelling, turning and stopping and also memorized data for distances. The pulse number in the central pulse train corresponds to the data for distance. A multiplier circuit is connected to the output stage of the central processor circuit in order to control the revolving speeds of the driving wheels. The revolving speeds of the driving wheels are controlled by changing the frequency of the control pulse train.

The control pulse train is input through a synchronizing circuit (122) into the deviation counter circuit (123). The signals for revolving speeds of the driving wheels (5R), (5L) are input into the rotary encoders (7R), (7L) to form pulses and the pulses are input into the pulse counter circuit and are input through the synchronizing circuit (122) into the deviation counter circuit (123). Thus, the control pulse train and the driving wheel pulse trains are added or subtracted in the deviation counter circuit (123) to form a position feedback loop. The travelling distance of the robot vehicle can be controlled to a desired distance.

On the other hand, the signals for revolving speeds of the driving wheels which are included as frequency components in the control pulse train are converted into analog voltages for controlling the servo motors (9R), (9L) in the D/A converter circuit and the analog voltages are input into the servo devices (11R), (11L). The calibration circuit is the circuit for calibrating the curved travelling and the deviation in the straight travelling of the robot vehicle shown in FIG. 6. The gyro-interface circuit operates a digital conversion of the azimuth signal (analog signal) output from the gyro device (14) and feeds the digital signal into the central processor circuit and the calibration circuit. The signals for the turning and the completion of the turning in the set point turning are fed from the central processor circuit to the servo-motors (9R), (9L) depending upon the azimuth in the digital conversion. The signals are also input into the calibration circuit as the signals for calibrating the curved travelling and the deviation in the straight travelling of the robot vehicle.

Figure 10:
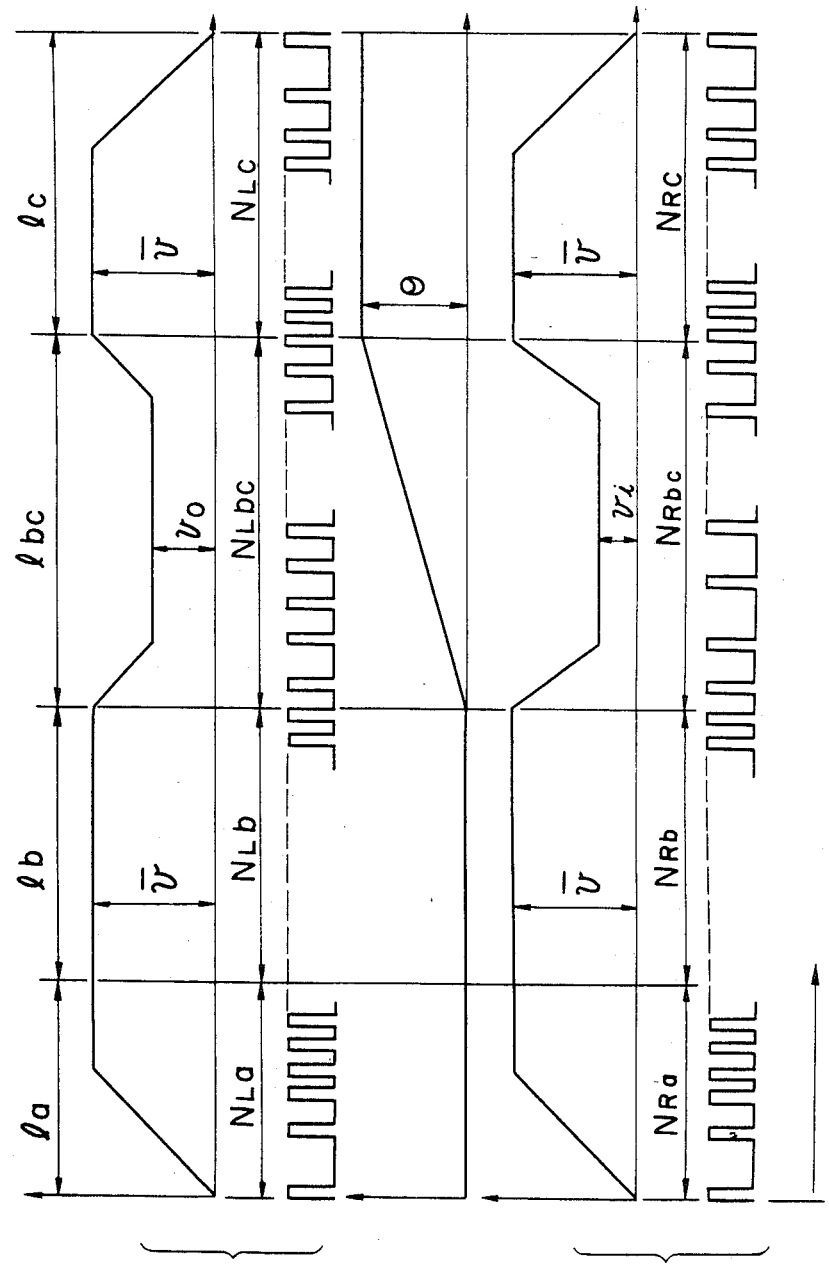
FIG. 10 is a time chart for control operations in the embodiment of the present invention in the travelling route shown in FIG. 4.

FIG. 10 is a time chart for the operation in the travelling route shown in FIG. 4. In FIG. 10, the pulse numbers of the control pulse train in the travelling sections (1a-1c) are shown as N. For example, the robot vehicle (1) travels in the straight direction in the routes 1a-1b-1c. Thus, the pulse numbers of the left driving wheel system NLa, NLb, NLc are respectively equal to the corresponding pulse numbers of the right driving wheel system NRa, NRb, NRc and the driving wheel speed V is the same. Therefore, the pulse frequency mode is the same and the signal for azimuth of the gyro device (14) is zero. The section 1bc is the section for turning the robot vehicle (1). The revolving speeds of the right and left driving wheels are different as shown by the equation (3) and the pulse frequency mode is different. In the section, the signal for azimuth is changed. When it reaches to the desired angle for turning $\theta$, the straight travelling in the section 1c is performed.

The pulse number corresponding to the revolving speeds of the right and left driving wheels in the turning section 1bc is given by the equation:

$$\frac{NLbc - NRbc}{2} = a\theta \quad (5)$$

($\theta$ is in radian).

The angle for turning is detected by the signal for azimuth. Therefore, the equation (5) can be used for the signal for monitoring the turning operation.

When the gyro device is used for detecting the azimuth as the aforementioned embodiment, it is necessary to overcome the drift phenomenon and the limitation in the measurement of azimuth in the principle of the gyro device. Therefore, the caging operation is performed. In the caging operation, the standard azimuth of the gyro device is changed in each operation. The data of azimuth in the travelling route of the robot vehicle can not be shown as the absolute azimuth.

In order to overcome the problem, when the robot vehicle reaches to the object point in the travelling route of the robot vehicle, for example, the work station, the gyro data as the azimuth are written in and potentially memorized. Then, a new reference azimuth is given by the caging operation. In the travelling to the next object point, the sum of the azimuth detected as the deviation from the new reference azimuth and the potentially memorized azimuth can be considered as the absolute azimuth from the reference azimuth at the start point.

This operation will be illustrated in detail.

Figure 11:
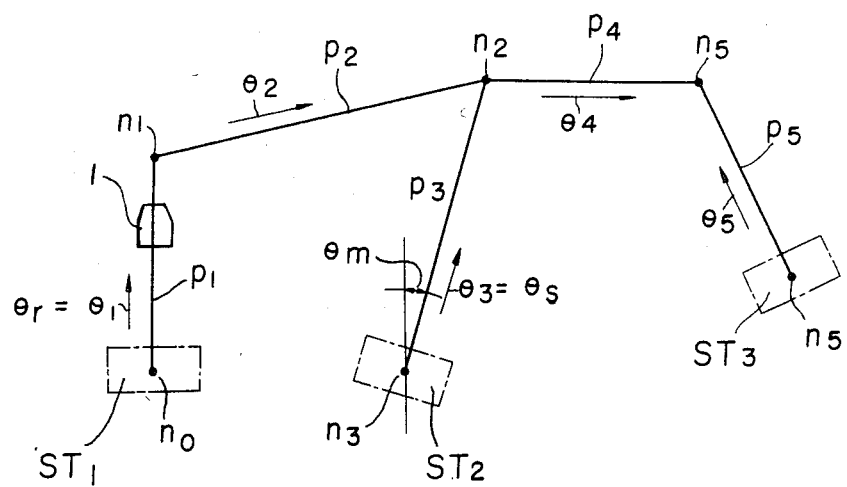
FIG. 11 is a view for improvement of data of azimuth in the case of the use of a gyro device.

FIG. 11 is a schematic view of the travelling route of the robot vehicle in one embodiment of the present invention.

In FIG. 11, the references $P_1$-$P_5$ designate linear parts of the travelling route (hereinafter referred to as path); $n_0$-$n_5$ respectively designate the start point, the turning point and the object point (hereinafter referred to as nodes) work stations $ST_1$, $ST_2$ and $ST_3$ are respectively placed at the corresponding nodes.

When the robot vehicle (1) is a baggage cart, the work stations $ST_1$ . . . are used as stations for trans-shipping baggages.

The robot vehicle (1) travels in the travelling route from the start point of the node $n_1$ through the paths $P_1 \rightarrow P_2 \rightarrow P_3$ to the object point of the node $n_3$. After the completion of the desired operation, it travels further through the paths $P_3 \rightarrow P_4 \rightarrow P_5$ to the next object point of the node $n_5$. In the operation, the data of the distance from the node $n_0$ as the start point to the node $n_1$ corresponding to the predetermined path $P_1$ and the azimuth $\theta_1$ are read out from the memory (3). The travelling distance and the azimuth detected by the wheel revolving speed-detecting mechanism (7R), (7L) and the gyro device (14) are controlled so as to correspond to the command data in the practical travelling. At the node $n_1$, the robot vehicle (1) turns to the direction $\theta_2$ in FIG. 11. The turning operation is easily attained by the opposite revolution of the right and left driving wheels (5R), (5L) at the same speed and the same degree. In the travelling on the paths $P_2$ and $P_3$, the same consideration is applied. Thus, the robot vehicle (1) reaches to the first object station $ST_2$ as the node $n_3$. In view of a next convenient operation, the robot vehicle (1) travels on the path $P_3$ under the condition forwarding the top of the cart to the node $n_2$ (backward travelling condition).

It is also possible to travel the robot vehicle (1) from the node $n_3$ to the node $n_5$ on the paths $P_3 \rightarrow P_4 \rightarrow P_5$. However, it is necessary to perform the caging for forcibly returning the gyro device to the original position within a predetermined time corresponding to the required accuracy in order to overcome the drift phenomenon caused by the gyro principle. That is, the output for the azimuth of the gyro device is reset to be zero. Therefore, in the travelling route shown in FIG. 11, it is preferable to perform the casing operation when the robot vehicle (1) reaches to the station $ST_2$ or $ST_3$. However, the reference azimuth at the station $ST_2$ or $ST_3$ is disadvantageously changed after the caging operation. In order to overcome the problem, the following improvement is considered.

Referring to FIG. 11, the travelling of the robot vehicle (1) from the node $n_0$ to the node $n_3$ through the paths $P_1 \rightarrow P_2 \rightarrow P_3$ will be considered.

The casing operation is performed at the node $n_0$ before starting the robot vehicle (1) and the output of the azimuth of gyro device (14) is reset to be zero. Thus, the reference azimuth $\theta r$ at the node $n_0$ as the start point is zero. When an azimuth $\theta_1$ corresponding to the path $P_1$ is given to be $\theta r = \theta_1$, the travelling control is easier.

The command data of azimuth are given by the equation:

$$[\theta at] = [\theta_1 t, \theta_2 t, \theta_3 t]$$

The data of azimuth detected in the practical travelling $[\theta a] = [\theta_1, \theta_2, \theta_3]$ together with the data of travelling distance are compared with the command data of azimuth to be equal in the travelling of the robot vehicle (1) to reach to the object point of the node $n_3$. Before the caging operation, the output of azimuth of the gyro device (14) (the azimuth $\theta_3$) is temporarily memorized in the memory device (13). The memorized azimuth $\theta m$ is given as $\theta m = \theta_3$. Then, the output of azimuth is reset to be zero by the caging operation and the new reference azimuth $\theta s$ is given. Thus, $\theta_3 = 0$ after the caging operation.

The travelling of the robot vehicle (1) from the node $n_3$ to the node $n_5$ through the paths $P_3 \rightarrow P_4 \rightarrow P_5$ is considered. In the travelling, the reference azimuth is $\theta_3$ at the node $n_3$. The data for azimuth detected in the travelling in the travelling route: $[\theta b] = [\theta_3, \theta_4, \theta_5]$ are detected as the values from the reference $\theta s$.

On the other hand, the command data of azimuth $[\theta bt]$ corresponding to the route are based on the same reference azimuth $[\theta r]$ for the data of azimuth $[\theta at]$. Therefore $[\theta bt]$ and $[\theta b]$ can not be directly compared. The following operation is required. The sums $[\theta_3 + \theta m, \theta_4 + \theta m, \theta_5 + \theta m]$ of data of azimuth $[\theta b]$ detected in the travelling and the azimuth $\theta m$ which is temporarily memorized at the node $n_3$ are compared with the command data of azimuth $[\theta bt]$.

The sums $[\theta b + \theta m] = [\theta_3 + \theta m, \theta_4 + \theta m, \theta_5 + \theta m]$ show deviation from the initial reference azimuth $\theta r$. Even though the caging operation is performed in the travelling, the data of azimuth are kept as the deviations from the constant reference azimuth which are absolute azimuth.

In the case of the return of the robot vehicle (1) from the node $n_5$ through the paths $P_5 \rightarrow P_4 \rightarrow P_2 \rightarrow P_1$ to the node $n_1$, when the robot vehicle (1) reaches to the node $n_5$, the azimuth $\theta_5$ is temporarily memorized before the caging operation at the point and the absolute azimuth can be kept in the travelling by the same operation. The integrally memorized azimuth $\theta_5$ is added to the previously memorized data $\theta m (= \theta_3)$. The temporarily memorized azimuth is given to be $\theta m + \theta_5$. In the aforementioned case, the azimuth can be positive or negative angle to the reference azimuth of zero.

Even though the measurable azimuth range of the gyro device (14) is limited in view of the gyro mechanism, the azimuth can be easily controlled by the embodiment. For example, when the measurable azimuth range is in ±90 degree, it is possible to control it by performing the caging operation before reaching the output of azimuth to 90 degree, and memorizing temporarily the data of azimuth before the caging operation and adding the data to the output after the caging operation.

The calibration of the error in the travelling of the robot vehicle is also attained by placing a position indicating plate having a reflector in the travelling route and using a photoelectric sensor comprising a light emitter equipped on the robot vehicle and a light receiver whereby the robot vehicle is lead in the reference travelling route under finding the relative position of the robot vehicle from the position indicating plate which is detected by the combination of the sensor.

We claim:

1. A robot vehicle for automatic operation in a predetermined travelling route which comprises:
    a pair of driving wheels connected to a driving device;
    means for detecting the revolving speed of each of said driving wheels and providing a travelling distance of said vehicle;
    a gyro for detecting azimuth of the travelling direction of said robot vehicle;
    a first memory means for memorizing a travelling program including data of a programmed travelling distance and a programmed azimuth;
    a control processor device which controls the travelling of said robot vehicle depending upon the travelling program of said first memory means by comparing the travelling distance and azimuth of said travelling program with a travelling distance detected by said revolving speed detector means and an azimuth detected by said gyro wherein said control processor device outputs a control signal;
    means for controlling the turning of said vehicle in response to said control signal by individually controlling the speed of each of said driving wheels; and
    calibration adjustment means including a second memory means for storing the value of said detected azimuth of said gyro at predetermined locations during said travelling route, means for adjusting said detected azimuth of said gyro to zero at said predetermined locations in said predetermined travelling route, and a means for updating said detected azimuth by the value stored in said second memory means, wherein said calibration adjustment means further includes a path deviation correcting means for correcting a deviation from a programmed straight line segment of travel of said vehicle, wherein said path deviation means provides a compensation control signal to said vehicle wheels in order to return said vehicle to said programmed straight line segment.

* * * * *